United States Patent [19]

Tieszen

[11] 3,928,675

[45] Dec. 23, 1975

[54] CRACKLE FINISH COATING OF ARYLENE SULFIDE POLYMER CONTAINING A FLUOROCARBON POLYMER

[75] Inventor: Dale O. Tieszen, Bartlesville, Okla.

[73] Assignee: Phillips Petroleum Company, Bartlesville, Okla.

[22] Filed: Sept. 13, 1974

[21] Appl. No.: 505,919

Related U.S. Application Data

[62] Division of Ser. No. 299,066, Oct. 19, 1972, Pat. No. 3,857,852.

[52] U.S. Cl. ................ 427/257; 427/385; 427/388
[51] Int. Cl.² ........................................... B05D 5/00
[58] Field of Search...... 117/38, 41, 119.6, 161 UG, 117/132 B, 132 CF, 132 A; 260/29.1, 37 P, 29.6 F, 33.4 F, 900

[56] References Cited
UNITED STATES PATENTS
3,622,376  11/1971  Tieszen et al. ................. 117/132 B

*Primary Examiner*—Thomas J. Herbert, Jr.
*Assistant Examiner*—Bruce H. Hess

[57] ABSTRACT

A decorative crackle arylene sulfide polymer coating is provided by first subjecting the arylene sulfide polymer and a light colored pigment such as titanium dioxide to intensive milling and thereafter mixing the resulting blend with a fluorocarbon polymer in the presence of water and a dispersing agent utilizing a less intensive mixing technique such as a propeller driven blender.

10 Claims, No Drawings

CRACKLE FINISH COATING OF ARYLENE SULFIDE POLYMER CONTAINING A FLUOROCARBON POLYMER

This application is a divisional of copending application Ser. No. 299,066, filed Oct. 19, 1972, now U.S. Pat. No. 3,857,852.

BACKGROUND OF THE INVENTION

This invention relates to the preparation of crackle finish arylene sulfide polymer coatings.

Arylene sulfide polymers are known for their desirable characteristics as coating compositions as shown by Ray U.S. Pat. No. 3,492,125. Because of the hardness and durability of such coatings they are of value for many applications including decorative coatings on appliances, housewares, and the like. It has been found desirable in some instances to incorporate a fluorocarbon polymer with the arylene sulfide polymer. While such compositions can tend to give rough coatings, certain precise techniques have been developed for circumventing this problem and obtaining the same smooth coating of uniform appearance with a fluorocarbon present as is obtained without the fluorocarbon.

BRIEF SUMMARY OF THE INVENTION

It is an object of this invention to provide an arylene sulfide polymer coating which is not rough but which nonetheless has a crackle finish.

It is a further object of this invention to provide a method for incorporating fluorocarbon polymers in arylene sulfide coating composition so as to achieve a crackle finish.

It is yet a further object of this invention to provide an arylene sulfide polymer coating having a decorative and attractive crackle finish.

In accordance with this invention, an arylene sulfide polymer in particulate form is subjected to intensive milling with a light colored pigment such as titanium dioxide and thereafter mixed under less intensive conditions with a fluorocarbon polymer in the presence of a liquid capable of wetting the mixture.

DESCRIPTION OF THE PREFERRED EMBODIMENTS

The instant invention is applicable to the production of crackle finishes of arylene sulfide polymer having any normally solid fluorocarbon polymer incorporated therein. It is of particular utility in compositions having high molecular weight fluorocarbon polymer, that is fluorocarbon polymers of such molecular weight that no flow is obtained in the ASTM D 1238 melt viscosity test at 380°C using a 5,000 g weight. Such polymers probably have a number average molecular weight greater than 10,000,000. These are the types of polymers generally referred to as extrusion or molding grade polymers. Such polymers are sold under trademarks Teflon-5, Teflon-6, Teflon-7, and Halon G-80. These polymers pass the FDA specification for acceptable polytetrafluoroethylene in food service which requires a melt viscosity of at least 10,000 poise at 380°C as determined by ASTM D 1238 and a thermal instability index (TII) of less than 50 as determined by ASTM D 1457.

Most preferably the fluorocarbon polymer is a mixture of the above-described high molecular weight polytetrafluoroethylene with a lower molecular weight coating grade polytetrafluoroethylene such as that sold by LNP Corp. as TL-126. The ratio of high molecular weight to lower molecular weight polytetrafluoroethylene can vary greatly but generally will be in the range of 1-10 parts by weight of high molecular weight polytetrafluoroethylene to each one part by weight of lower molecular weight polytetrafluoroethylene.

The invention is applicable to the production of dispersions of any arylene sulfide polymer although the preferred polymer is polyphenylene sulfide having a melting or softening point of at least 300°F, preferably 400 to 850°F. The intensive milling of the pigment with the arylene sulfide polymer can be accomplished by the use of a conventional ball mill, a conventional rod mill, or a vibratory ball mill. The balls or rods can be made of steel, ceramic materials such as Burundum, and the like. The milling can be done either wet or dry although dry milling is preferred.

It is essential that the resulting pigment-arylene sulfide polymer mixture thereafter be blended with the fluorocarbon polymer in the presence of a liquid capable of wetting same such as water containing a surface active agent under less intensive conditions than those used for the initial milling. This blending can be done utilizing a Waring blender or any similar blade type mixing device. It can also be done by tumbling or shaking the components together. It is essential that the material at this point not be subjected to intensive milling such as obtained in a ball mill because the fluorocarbon polymer will agglomerate and give a rough finish. Thus, the first step utilizes a "milling" operation as that word is conventionally used in the art to designate intensive milling procedures such as ball milling and the second step utilizes a "blending" operation as that word is conventionally used in the art to designate less intensive simple mixing operations such as blending with a propeller.

Any light colored pigment capable of withstanding a curing temperature of at least about 300°F, preferably 600°–800°F can be utilized. The preferred pigment is titanium dioxide or compositions comprising a major amount of titanium dioxide and a minor amount of another pigment.

The liquid in which the mixture is ultimately blended can be any liquid capable of wetting the mixture. The preferred liquid is water containing a surface active agent. Other suitable liquids include ethylene glycol, propylene glycol, and mixtures of such liquids with water. Any conventional surface active agent can be utilized, however, nonionic surface active agents are preferred.

The ratio of solids (comprising the arylene sulfide polymer, pigment, and fluorocarbon polymer) to liquid can vary depending on a particular coating application; however, it is generally preferred to have a dispersion with about 15 to 60, preferably 25 to 50 weight percent solids.

The intensive milling times can vary depending on the type of mixture utilized, with the conventional ball mill or rod mill dry mixing times generally being 5–100, preferably 10–48 hours. With a high speed vibrator with stainless steel balls such as a Vibratom mill the same intensive milling can be accomplished in ½ hour to 5 hours or so.

The subsequent blending under less intensive conditions generally requires only a matter of minutes, usually 1–60, preferably 5–15 minutes. Of course, this again can vary considerably depending on the type of blending apparatus utilized.

The ratio of arylene sulfide polymer to fluorocarbon in the final cured coating composition will generally range from 3:1 to 30:1, preferably 5:1 to 20:1 based on weight.

The ratio of arylene sulfide polymer to pigment will generally be in the range of 1:1 to 10:1 based on weight.

It is essential that the pigment, fluorocarbon polymer, and arylene sulfide polymer be in a particulate form. In general, the smaller the particle size the better the dispersions which can be produced. A suitable particle size for the fluorocarbon polymer is 40 mesh or smaller. The pigment can be the same particle size (40 mesh) or smaller. The arylene sulfide polymer will generally be about 40 mesh or smaller although satisfactory results can be obtained with coarser material, for instance 30 mesh or smaller. The intensive milling will generally reduce the arylene sulfide polymer particle size with the final particle size generally being below 100 mesh (Standard U.S. Sieve Series).

The final dispersion can be applied to a substrate by any conventional means such as spraying, or with a doctor blade or the like. The resulting coating can be cured, for instance, by heating to a temperature of at least 500°F, preferably 600°–850°F for at least 5 minutes, preferably 15 minutes to 2 hours. Alternatively, the coatings can be cured at higher temperatures for shorter times. Coating thicknesses can vary depending on the particular application but generally will be a fraction of a mil thicker than smooth coatings not having a crackle finish. A thickness of 1–3 mils is desirable in most instances.

The resulting coatings while not of primary utility for nonstick food applications nonetheless are relatively smooth in spite of the crackle appearance.

EXAMPLE

A dispersion of polyphenylene sulfide having an inherent viscosity of about 0.15, as determined using 0.25 percent of the sample and chloronaphthalene at 206°C, and a particle size of less than 60 mesh, were made by mixing 150 g of said polyphenylene sulfide with 50 g of titanium dioxide in a laboratory rod mill for 16 hours. Thereafter 80 g of this mix, 4.5 g of a high molecular weight polytetrafluoroethylene sold by DuPont under the trademark Teflon-7, and 1.5 g of a lower molecular weight polytetrafluoroethylene sold by LNP Corp. as TL-126 were blended with 120 g of water containing one percent of a nonionic surface active agent (octylphenoxypolyethoxy ethanol) sold under the trademark Triton X-100 by Rohm & Haas Co. were blended in a Waring mixer for 10 minutes. The resulting dispersion was sprayed with a Binks Model 18B spray gun onto 3 × 6 × 0.020 inch aluminum alloy coupons which had been degreased by washing in acetone and blasted with a No. 100 abrasive. The resulting coatings were cured at 700°F for 30 minutes. The coating thickness was two mils. The resulting coating was relatively smooth to the touch but had a crackle appearance.

CONTROL I

A dispersion identical to that of the Example was made in an identical manner except red iron oxide was used in place of titanium dioxide. The resulting coating had a smooth appearance with no indication of a crackle finish.

CONTROL II

Ninety grams of polyphenylene sulfide identical to that utilized in the Example, 30 g of titanium dioxide identical to that of the Example, 6.75 g of high molecular weight polytetrafluoroethylene identical to that of the Example, 2.25 g of low molecular weight polytetrafluoroethylene identical to that of the Example, and 250 g of water containing 3 g of a surface active agent identical to that of the Example were ball milled together for 16 hours and sprayed onto identical coupons in an identical manner to that of the Example. The resulting coating was rough, being useless as a release coating and having an unattractive appearance.

While this invention has been described in detail for the purpose of illustration, it is not to be construed as limited thereby but is intended to cover all changes and modifications within the spirit and scope thereof.

I claim:

1. A process for forming a coated article comprising:
   applying to a substrate a dispersion formed by subjecting a poly(arylene sulfide) in particulate form to intensive milling by ball milling or rod milling with a light colored pigment in particulate form capable of withstanding a curing temperature of at least about 300° F; thereafter under less intensive conditions blending the resulting mixture by blade mixing, tumbling, or shaking with a fluorocarbon polymer in particulate form, in the presence of a liquid selected from the group consisting of water, ethylene glycol, propylene glycol, and mixtures thereof; and
   heating said thus applied dispersion at a temperature of at least 500°F for at least 5 minutes to obtain a cured coating having a crackle finish.

2. A method according to claim 1 wherein said fluorocarbon polymer is polytetrafluoroethylene and said pigment is titanium dioxide.

3. A method according to claim 2 wherein a ratio of said poly(arylene sulfide) to said fluorocarbon polymer in said cured coating is within the range of 3:1 to 30:1 based on weight.

4. A method according to claim 3 wherein said liquid is water containing a surface active agent.

5. A method according to claim 4 wherein said poly(arylene sulfide) is polyphenylene sulfide.

6. A method according to claim 5 wherein said poly(arylene sulfide) has a particle size of 40 mesh or smaller, said fluorocarbon polymer has a particle size of 40 mesh or smaller, and said pigment has a particle size of 40 mesh or smaller.

7. A method according to claim 5 wherein the ratio of said arylene sulfide polymer to pigment is within the range of 1:1 to 10:1 based on weight and the total solids content in said dispersion is within the range of 15 to 60 percent based on the total weight of said dispersion.

8. A method according to claim 1 wherein said dispersion is applied to said substrate by means of spraying.

9. A method according to claim 1 wherein said dispersion is heated to a temperature of 600° to 850°F for 15 minutes to 2 hours to effect said cure.

10. A coated article produced by the method of claim 1.

* * * * *